United States Patent
Ito et al.

(10) Patent No.: US 7,917,802 B2
(45) Date of Patent: Mar. 29, 2011

(54) WRITE OMISSION DETECTOR, WRITE OMISSION DETECTING METHOD, AND COMPUTER PRODUCT

(75) Inventors: Mikio Ito, Kawasaki (JP); Hidejirou Daikokuya, Kawasaki (JP); Kazuhiko Ikeuchi, Kawasaki (JP); Hideo Takahashi, Kawasaki (JP); Yoshihito Konta, Kawasaki (JP); Norihide Kubota, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 355 days.

(21) Appl. No.: 11/902,772

(22) Filed: Sep. 25, 2007

(65) Prior Publication Data
US 2008/0151407 A1    Jun. 26, 2008

(30) Foreign Application Priority Data
Dec. 21, 2006   (JP) .................................. 2006-344884

(51) Int. Cl.
*G06F 11/00* (2006.01)
(52) U.S. Cl. ............................................ 714/6; 714/801
(58) Field of Classification Search .................. None
See application file for complete search history.

(56) References Cited

U.S. PATENT DOCUMENTS

| | | | |
|---|---|---|---|
| 7,215,497 B2 | 5/2007 | Urata | |
| 7,308,601 B2 | 12/2007 | Ikeuchi et al. | |
| 2004/0225913 A1* | 11/2004 | Hori | 714/6 |
| 2006/0179217 A1* | 8/2006 | Ito et al. | 711/112 |
| 2008/0126848 A1* | 5/2008 | Yoshida | 714/6 |
| 2009/0055682 A1* | 2/2009 | Gibson et al. | 714/6 |

FOREIGN PATENT DOCUMENTS

| | | |
|---|---|---|
| JP | 2002-008319 | 1/2002 |
| JP | 2003-036146 | 2/2003 |
| JP | 2003-331403 | 11/2003 |
| JP | 2006-031332 | 2/2006 |
| JP | 2006-164319 | 6/2006 |
| JP | 2006-252530 | 9/2006 |

OTHER PUBLICATIONS

Japanese Office Action for corresponding Japanese Application 2006-344884; mailed Mar. 10, 2009.
Japanese Office Action for corresponding Japanese Application 2006-3448841 issued Jun. 3, 2009.
Korean Office Action for corresponding Korean Application 10-2007-0103083; issued Jun. 30, 2009.
Japanese Office Action for corresponding Japanese application 2006-344884; issued Sep. 8, 2009.

* cited by examiner

*Primary Examiner* — Christopher S McCarthy
(74) *Attorney, Agent, or Firm* — Staas & Halsey LLP

(57) ABSTRACT

A device adaptor that controls a disk, wherein a storage area is divided into a plurality of blocks, detects a block that includes a read error. Next, the device adaptor detects a write omission in blocks that are within a predetermined range from the block that includes the read error. To be specific, the device adaptor reads data from the blocks that are in the vicinity of the block that includes the unrecovered read error in a suspect disk. Next, the device adaptor reads from a redundant disk, data of a block that corresponds to the block that includes the unrecovered read error (data of block "B" in an example shown in FIG. 1) and compares the read data to the data read from the suspect disk to detect the write omission.

17 Claims, 11 Drawing Sheets

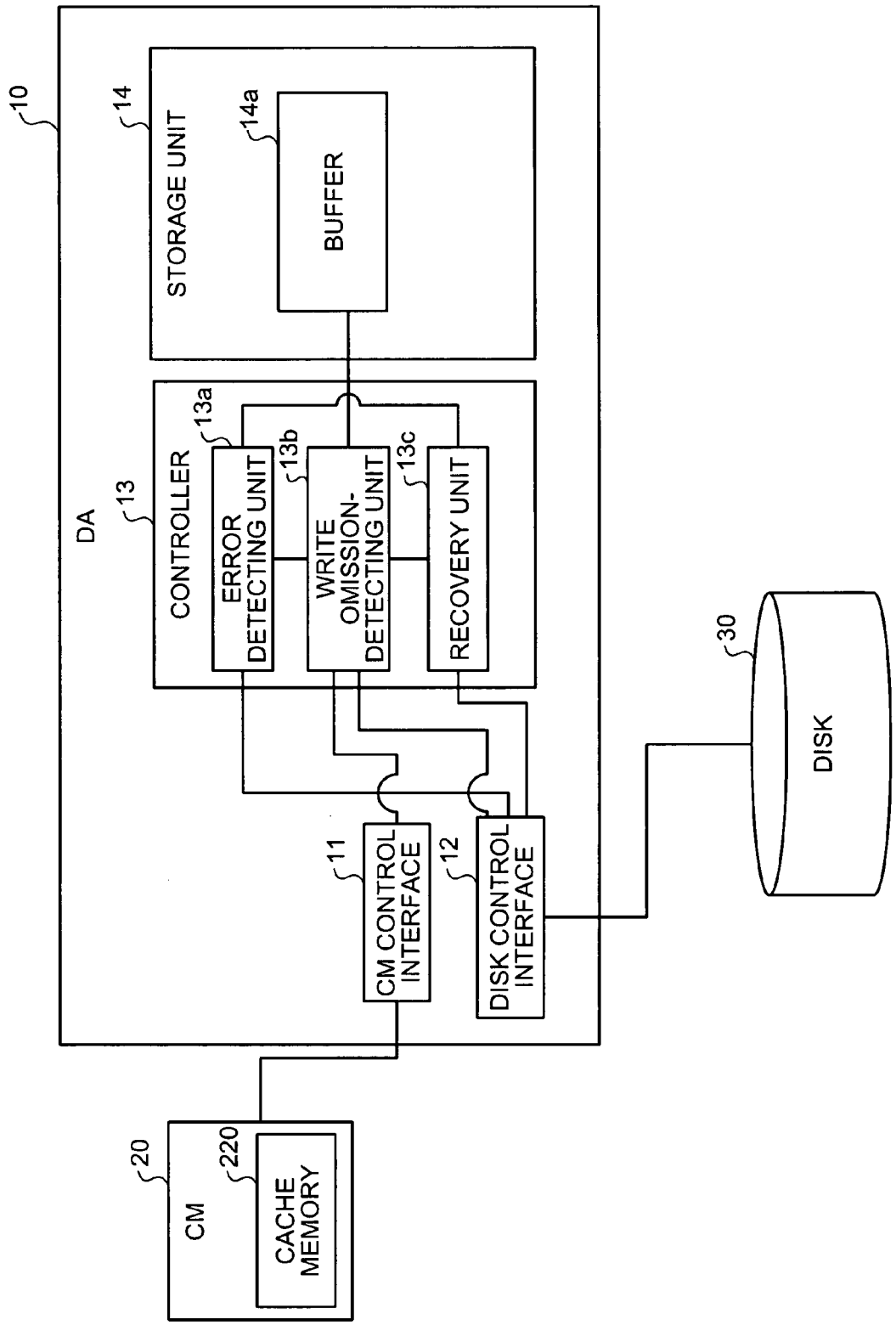

| SENSE KEY | SENSE CODE | CONTENT | CAUSE OF OCCURRENCE |
|---|---|---|---|
| 03 TYPE | 15-01 | IRRETRIEVABLE SEEK ERROR OCCURRED | SUDDEN VIBRATIONS |
| | 15-02 | LBA READ FROM MEDIUM DOES NOT MATCH WITH EXPECTED VALUE | DATA ACCESS ABNORMALITY OCCURRED DUE TO MALFUNCTIONING OF MOUNTED DEVICES RESULTING FROM ENVIRONMENTAL CONDITION EXCEEDING SPECIFICATION RANGE |

(b)

| SENSE KEY | SENSE CODE | CONTENT | CAUSE OF OCCURRENCE |
|---|---|---|---|
| 03 TYPE | 11-0x | IRRETRIEVABLE READ ERROR OCCURRED | DATA ACCESS ABNORMALITY DUE TO SCRATCHES ON MEDIUM, DEFECTS IN HEAD CHARACTERISTICS, TA (THERMAL ASPERITY: ASPERITIES ON MEDIUM SURFACE) ETC |
| | 13-00 | UNDETECTED ERROR OCCURRED IN SYNC BYTE THAT IS IRRETRIEVABLE DATA PORTION | MINUTE DEFECTS IN SYNC BYTE PORTION DUE TO DUST FLOATING INSIDE DISK |
| | 14-00 | DATA OF TARGET DATA BLOCK (SECTOR) CANNOT BE DETECTED | DATA ACCESS ABNORMALITY OCCURRED DUE TO MALFUNCTIONING OF MOUNTED DEVICES RESULTING FROM ENVIRONMENTAL CONDITION EXCEEDING SPECIFICATION RANGE |
| | 16-00 | UNDETECTED ERROR OCCURRED IN SYNC BYTE THAT IS IRRETRIEVABLE DATA AREA | MINUTE DEFECTS IN SYNC BYTE PORTION DUE TO DUST FLOATING INSIDE DISK |

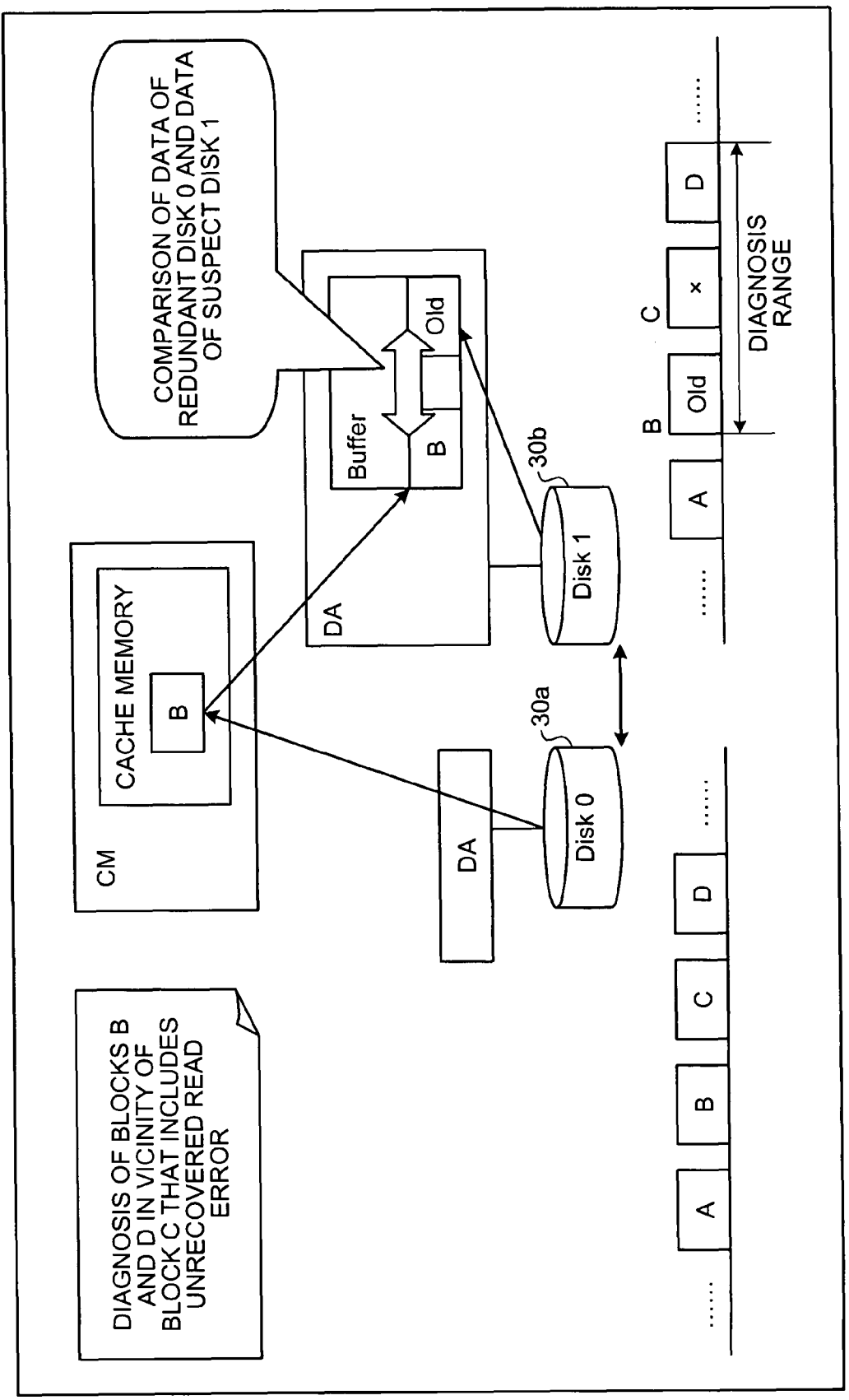

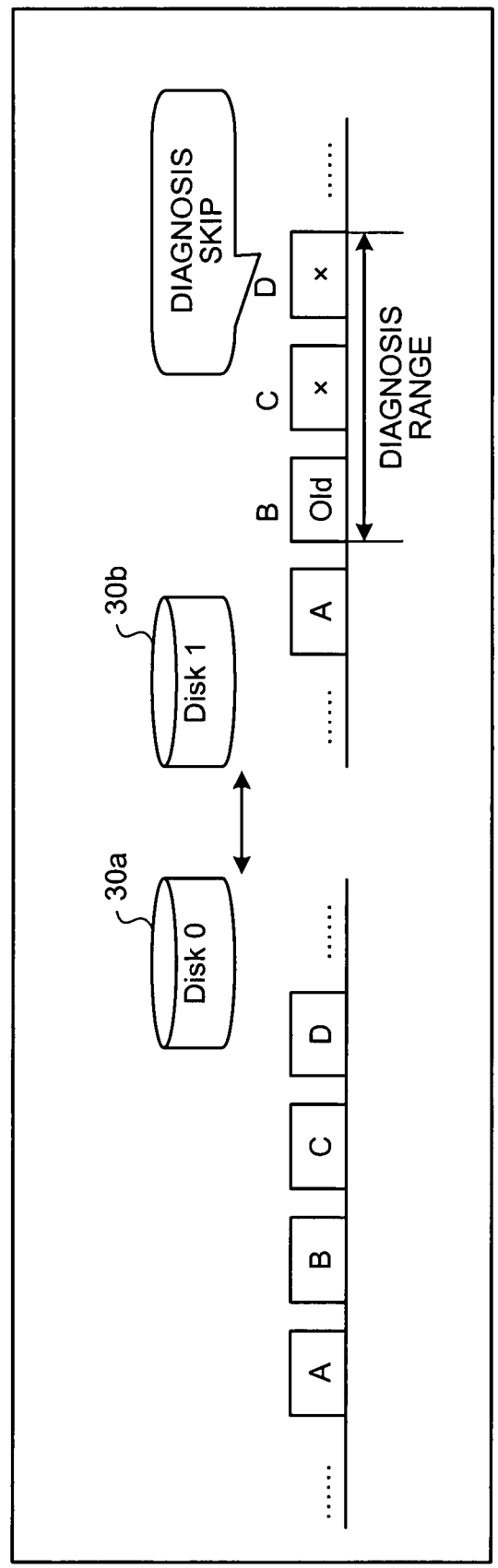

US 7,917,802 B2

WRITE OMISSION DETECTOR, WRITE OMISSION DETECTING METHOD, AND COMPUTER PRODUCT

BACKGROUND OF THE INVENTION

1. Field of the Invention

The present invention relates to a technology for detecting occurrence of write omission in a storage medium divided into a plurality of blocks.

2. Description of the Related Art

In a commonly used storage medium (for example, a disk) that is divided into a plurality of blocks, occurrence of a write omission prevents updating of data that is stored in each block and causes obsolete data to remain in the block. A cause of occurrence of the write omission is explained specifically with respect to FIG. 11. When a head carries out a write process to write updated data to the block that stores therein obsolete data, the head runs into dust particles etc. and data is not written to the block, thus causing obsolete data to remain in the block. The head running into the dust particles causes vibrations. Due to this, unreadable data (in other words, unrecovered read error) is written to adjacent blocks.

To take care of such a write omission, a write omission detecting method is carried out to detect the write omission. For example, a conventional write omission detecting method is disclosed in Japanese Patent Laid-open Application No. 2006-252530. In the conventional write omission detecting method, a history block, which stores therein updated data, is included for each block on the disk. When writing the updated data to the disk, a new updated status is stored in the history block and also stored in a memory of a central processing unit (CPU). Write omission is detected based on comparison of the updated status stored in the history block and the updated status stored in the memory.

However, in the conventional technology, because a process to detect the write omission is carried out after carrying out the write process, when carrying out the write process, detection of the write omission in all the blocks takes a significant time, which deteriorates the processing performance.

SUMMARY OF THE INVENTION

It is an object of the present invention to at least partially solve the problems in the conventional technology.

According to an aspect of the present invention, a write omission detector that detects write omission in a storage medium that is divided into a plurality of blocks includes a block detection unit that detects an error block that is a block that includes a read error; and a write-omission detecting unit that detects a write omission block based on comparison of data in blocks that are within a predetermined range from the error block and data in blocks inside a redundant storage medium.

According to another aspect of the present invention, a method of detecting write omission in a storage medium that is divided into a plurality of blocks includes first detecting including detecting an error block that is a block that includes a read error; and second detecting including detecting a write omission block based on comparison of data in blocks that are within a predetermined range from the error block and data in blocks inside a redundant storage medium.

According to still another aspect of the present invention, a computer-readable recording medium stores therein a computer program that causes a computer to realize the above method.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 3 is a block diagram of the device adaptor according to the first embodiment;

FIG. 4 is a schematic for explaining an example of error content;

FIG. 5 is a schematic for explaining a write omission detecting process;

FIG. 6 is a schematic for explaining a diagnosis skip in the write omission detecting process;

DETAILED DESCRIPTION OF THE PREFERRED EMBODIMENTS

Exemplary embodiments of the present invention are explained in detail below with reference to the accompanying drawings. An example in which the present invention is incorporated in a device adaptor is explained below.

In the following embodiments, an overview, a salient feature, a structure, and a process flow of a device adaptor according to a first embodiment of the present invention are sequentially explained, and effects of the first embodiment are explained in the end. As shown in FIGS. 1 to 11, the device adaptor is referred to as Device Adaptor (DA).

First, an overview and a salient feature of the device adaptor according to the first embodiment are explained with reference to FIG. 1.

A device adaptor 10 is used as a write omission detector according to the first embodiment. In disks 30, which are divided into a plurality of blocks, the device adaptor 10 detects a write omission that prevents updating of data stored in each block and causes obsolete data to remain in the block. The device adaptor 10 prevents deterioration in the processing performance while detecting the write omission. A Redundant Arrays of Inexpensive Disks (RAID) device 1 having a redundant structure includes the device adaptor 10 and disks 30a and 30b.

Figure 1:
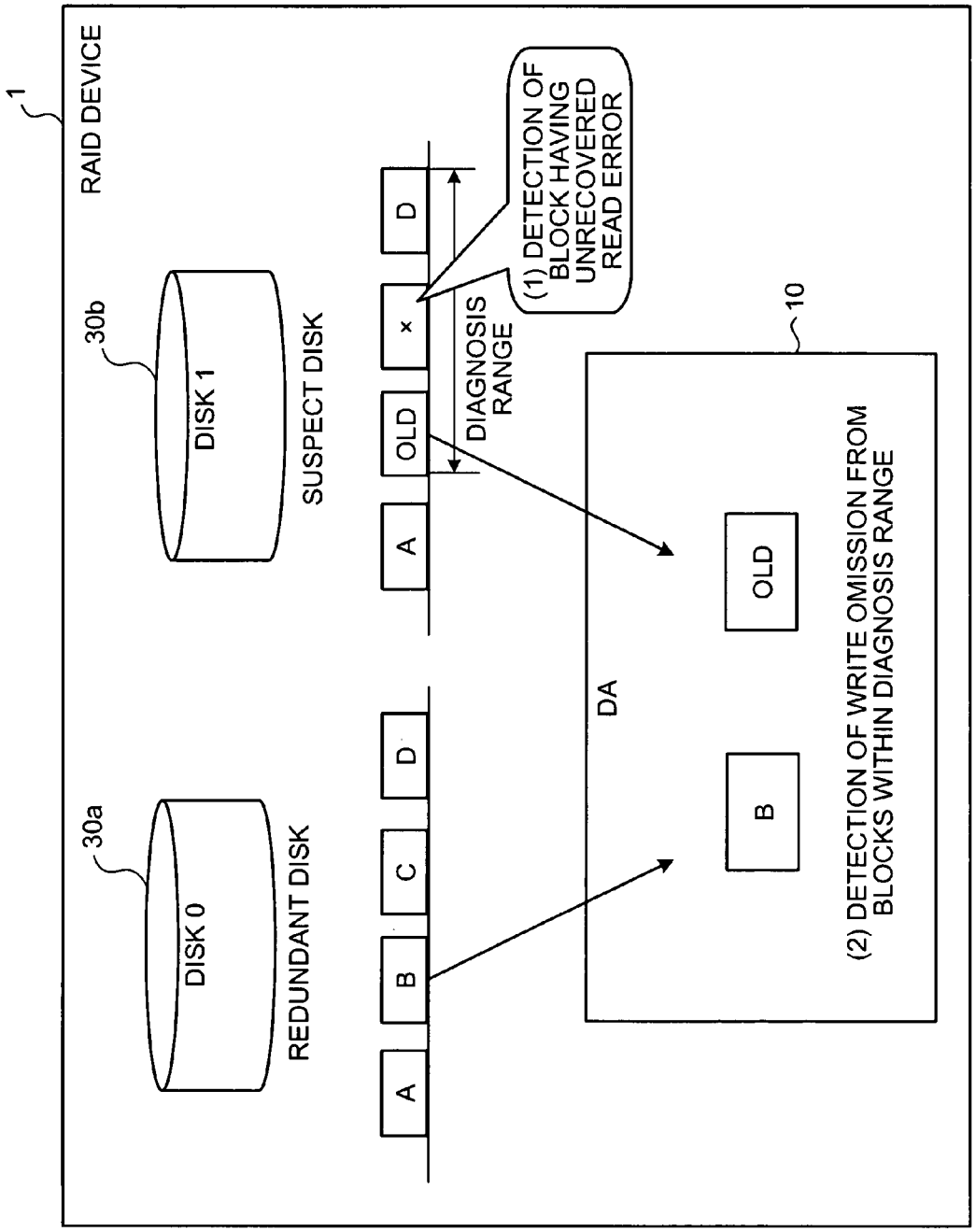
FIG. 1 is a schematic for explaining an overview and a salient feature of a device adaptor according to a first embodiment of the present invention.

The device adaptor 10, which controls the disks 30 that include a storage area divided into the blocks, detects a block that includes a read error (see (1) of FIG. 1). To explain with reference to FIG. 1, during a disk reply at the time of reading data from the disk 30b, the device adaptor 10 detects a block that includes an unrecovered read error that indicates that the block is an unreadable block. As shown in FIG. 1, the disk 30b, which includes the block that includes the detected unrecovered read error, is called "suspect disk" as a disk that is likely to include the write omission.

Next, the device adaptor 10 detects the write omission in the blocks that are within a predetermined range from the block that includes the detected read error (see (2) of FIG. 1). To be specific, the device adaptor 10 reads data of the blocks that are in the vicinity of the block that includes the unrecovered read error in the suspect disk 30b. Next, the device adaptor 10 reads from the redundant disk 30a, data of the block corresponding to the block that includes the unrecovered read error (block "B" in the example shown in FIG. 1), compares the read data to the data read from the suspect disk 30b, and detects the write omission. In other words, if the data of the redundant disk 30a and the data of the suspect disk 30b differ, the device adapter 10 determines that the block that stores the data includes the write omission and carries out a recovery process.

Due to this, when carrying out the write process, the device adaptor 10 detects the write omission without detecting write omissions in all the blocks. Thus, similarly as the main salient feature mentioned earlier, the device adaptor 10 can prevent deterioration of the processing performance while detecting the write omission.

Figure 2:
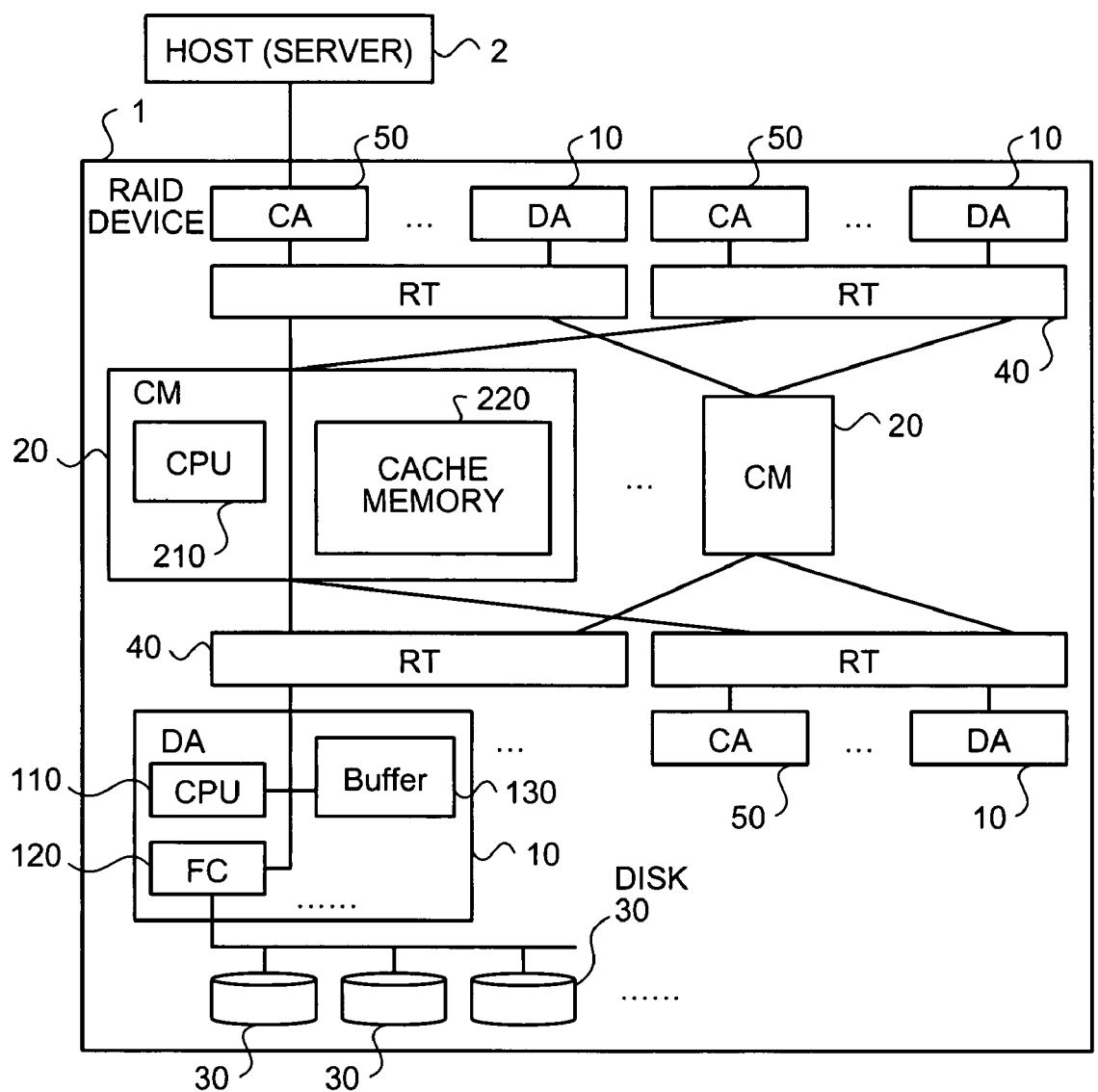
FIG. 2 is a block diagram of a RAID device according to the first embodiment.

An example of a hardware structure of the RAID device 1 which uses the DA 10 shown in FIG. 1 is explained next with reference to FIG. 2. As shown in FIG. 2, the RAID device 1 is connected to a server 2.

The RAID device 1 includes the DA 10, a controller module (CM) 20 that carries out control to transfer data to a router (RT) 40, the disks 30 that store therein data, the RT 40 that relays data, and a channel adapter (CA) 50 that controls the connection between the RAID device 1 and the server 2. The DA 10 includes a CPU 110, a fiber channel (FC) 120 that carries out a serial transfer, and a buffer 130 that temporarily stores therein data. The CM 20 includes a CPU 210, and a cache memory 220 that stores therein read data and write data.

Upon receiving a read request or a write request from the server 2, the RAID device 1 stores the read data or the write data in the cache memory 220 of the CM 20 via the RT 40. Based on the stored read data or the write data, the DA 10 carries out reading or writing to the disks 30.

The structure of the device adaptor 10 shown in FIG. 1 is explained with reference to FIG. 3. As shown in FIG. 3, the device adaptor 10 includes a CM control interface 11, a disk control interface 12, a controller 13, and a storage unit 14. The device adaptor 10 is connected to the CM 20 and the disks 30. A process of each component is explained next.

The CM control interface 11 controls communication related to various types of data that is transacted between the device adaptor 10 and the connected CM 20. To be specific, the CM control interface 11 receives from the cache memory 220 of the CM 20, the write data, the read data, or redundant data that is explained later.

The disk control interface 12 controls communication related to various types of data that is transacted between the device adaptor 10 and the connected disks 30. To be specific, the disk control interface 12 transceives data related to read or write between the device adaptor 10 and the disks 30.

The storage unit 14 stores therein data and programs that are necessary for various processes performed by the controller 13. Especially, the storage unit 14 includes a buffer 14a that is closely related to the present invention. The buffer 14a temporarily stores therein data that is read from the disks 30.

The controller 13 includes an internal memory for storing programs that regulate various process sequences and necessary data. The controller 13 uses the programs and the data to execute the processes. Especially, the controller 13 includes an error detecting unit 13a, a write omission-detecting unit 13b, and a recovery unit 13c that are closely related to the present invention. The error detecting unit 13a corresponds to "block detection unit" that is described in claims, and the write omission-detecting unit 13b corresponds to "write-omission detecting unit" that is described in claims.

The error detecting unit 13a detects a block that includes the read error. To be specific, if an error occurs during the disk reply at the time of reading data from the disks 30, the error detecting unit 13a determines whether the error is an unrecovered read error. If the error is an unrecovered read error, the error detecting unit 13a notifies the later explained write omission-detecting unit 13b to carry out a write omission detecting process in the periphery of the block that includes the unrecovered write error. If the error is not an unrecovered read error, the error detecting unit 13a notifies the later explained recovery unit 13c to execute a recovery process according to the error content.

An error detecting process is explained in detail with reference to FIG. 4. As shown in FIG. 4, upon occurrence of an error such as the errors indicated in (a) of FIG. 4, the error detecting unit 13a determines that the error is not an unrecovered read error. Upon occurrence of an error such as the errors indicated in (b) of FIG. 4, the error detecting unit 13a determines that the error is an unrecovered read error. In other words, the error detecting unit 13a determines whether the error has occurred due to a cause that is highly likely to result in occurrence of the write omission (for example, dust floating inside the disk etc.).

Returning to FIG. 3, the write omission-detecting unit 13b detects the write omission in the blocks that are within the predetermined range that is set by a not shown input unit from the block that includes the detected unrecovered read error. To be specific, upon receiving the notification to carry out the write omission detecting process from the error detecting unit 13a, the write omission-detecting unit 13b retrieves the cache memory 220 of the CM 20. Next, the write omission-detecting unit 13b determines whether a preceding block is already diagnosed.

If the preceding block is not already diagnosed, the write omission-detecting unit 13b reads from the cache memory 220, data of the block in the redundant disk 30a corresponding to the preceding block in the suspect disk 30b, and reads from the buffer 14a, data of the preceding block in the suspect disk 30b. If the preceding block is already diagnosed, the write omission-detecting unit 13b reads from the cache memory 220, data of the block in the redundant disk 30a corresponding to a succeeding block in the suspect disk 30b and reads from the buffer 14a, data of the succeeding block in the suspect disk 30b.

Next, the write omission-detecting unit 13b determines whether the read data of the redundant disk 30a matches with the read data of the suspect disk 30b. If the data of the redundant disk 30a does not match with the data of the suspect disk 30b, the write omission-detecting unit 13b notifies the later explained recovery unit 13c that the block includes the write omission. If the data of the redundant disk 30a matches with the data of the suspect disk 30b, the write omission-detecting unit 13b notifies the recovery unit 13c that the block does not include the write omission.

The write omission detecting process is explained by way of a specific example with reference to FIGS. 5 and 6. As shown in FIG. 5, the write omission-detecting unit 13b reads from the retrieved cache memory 220 of the CM 20, data of the block in the redundant disk 30a corresponding to the preceding block (data "B" in the example shown in FIG. 5)

and reads data of the preceding block from the buffer 14a of the DA 10 (data "Old" in the example shown in FIG. 5). Next, the write omission-detecting unit 13b determines whether the read data of the redundant disk 30a matches with the read data of the suspect disk 30b. If the read data of the redundant disk 30a does not match with the read data of the suspect disk 30b, the write omission-detecting unit 13b determines that the block that stores the data includes the write omission.

As shown in FIG. 6, if a block within a diagnosis range cannot be read due to the read error (a block "D" in the example shown in FIG. 6), the write omission-detecting unit 13b executes a diagnosis skip to remove the block from a detection target without determining whether the data of the redundant disk 30a matches with the data of the suspect disk 30b. If the disks 30 are in a degenerate state and the redundant disk 30a does not exist, because the write omission detecting process cannot be carried out, several blocks in the vicinity of the block having the unrecovered read error are likely to include obsolete data. Due to this, an error reply is returned in response to a read request to the blocks.

Returning to FIG. 3, the recovery unit 13c carries out recovery of data and restores normalcy. To be specific, upon receiving the notification from the error detecting unit 13a to execute the recovery process according to the error content for an error other than the unrecovered read error, the recovery unit 13c executes the recovery process according to the error content. Further, upon receiving the notification that the block includes the write omission, the recovery unit 13c updates the block that includes the write omission in the suspect disk 30b to the corresponding block of the redundant disk 30a.

After updating the block that includes the write omission or after receiving the notification that the block does not include the write omission, the recovery unit 13c determines whether the succeeding block is already diagnosed. If the succeeding block is not already diagnosed, the recovery unit 13c notifies and instructs the write omission-detecting unit 13b to carry out a diagnosis of the succeeding block. If the succeeding block is already diagnosed; the recovery unit 13c carries out the recovery process of error Logical Block Address (LBA) that indicates the block that includes the unrecovered read error.

Figure 7:
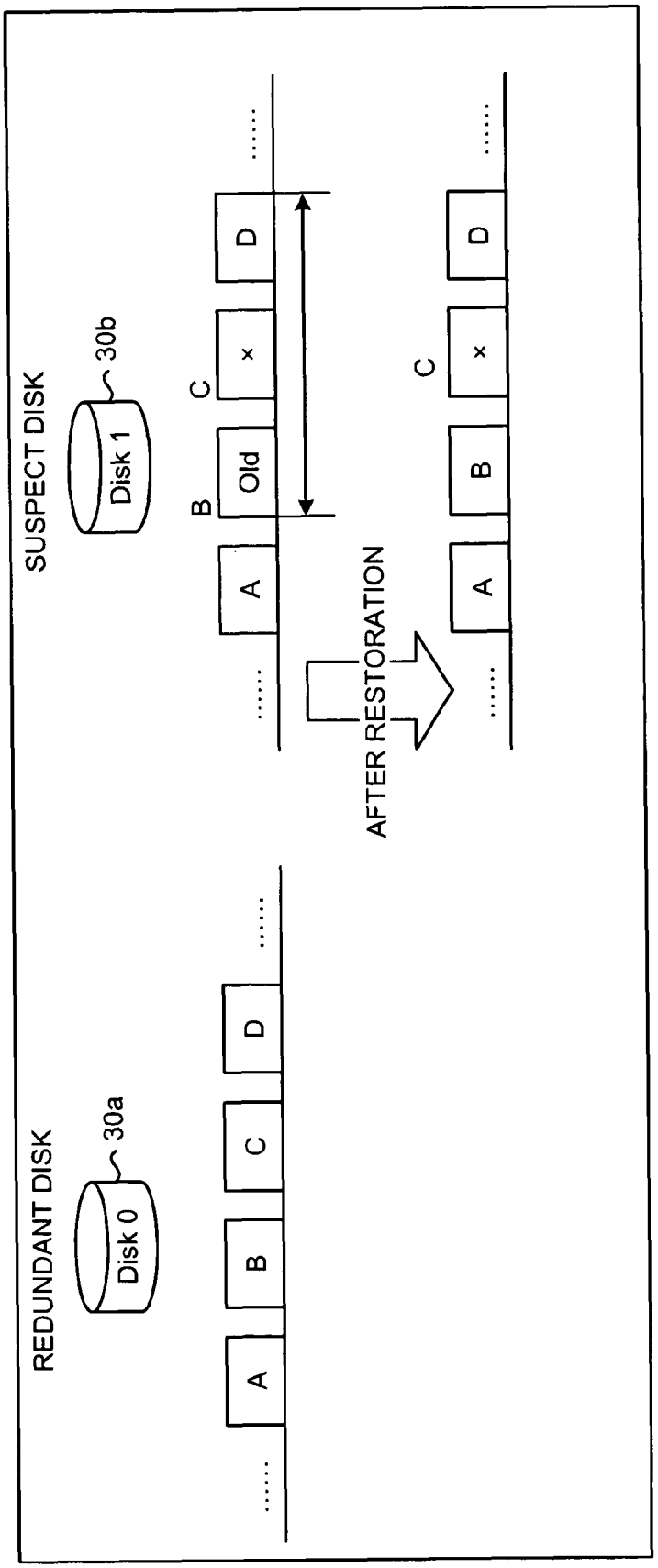
FIG. 7 is a schematic for explaining a recovery process.

The recovery process is explained by way of a specific example with reference to FIG. 7. As shown in FIG. 7, if data of the preceding block "B" in the suspect disk 30b is "Old" due to the write omission, the recovery unit 13c reads data "B" of the preceding block in the redundant disk 30a, and updates the read data "B" as data of the preceding block of the suspect disk 30b. In a method to carry out recovery, because the redundant disk 30a exists, the suspect disk 30b can be treated as a failed disk, thereby losing redundancy and resulting in the degenerated state.

Figure 8:
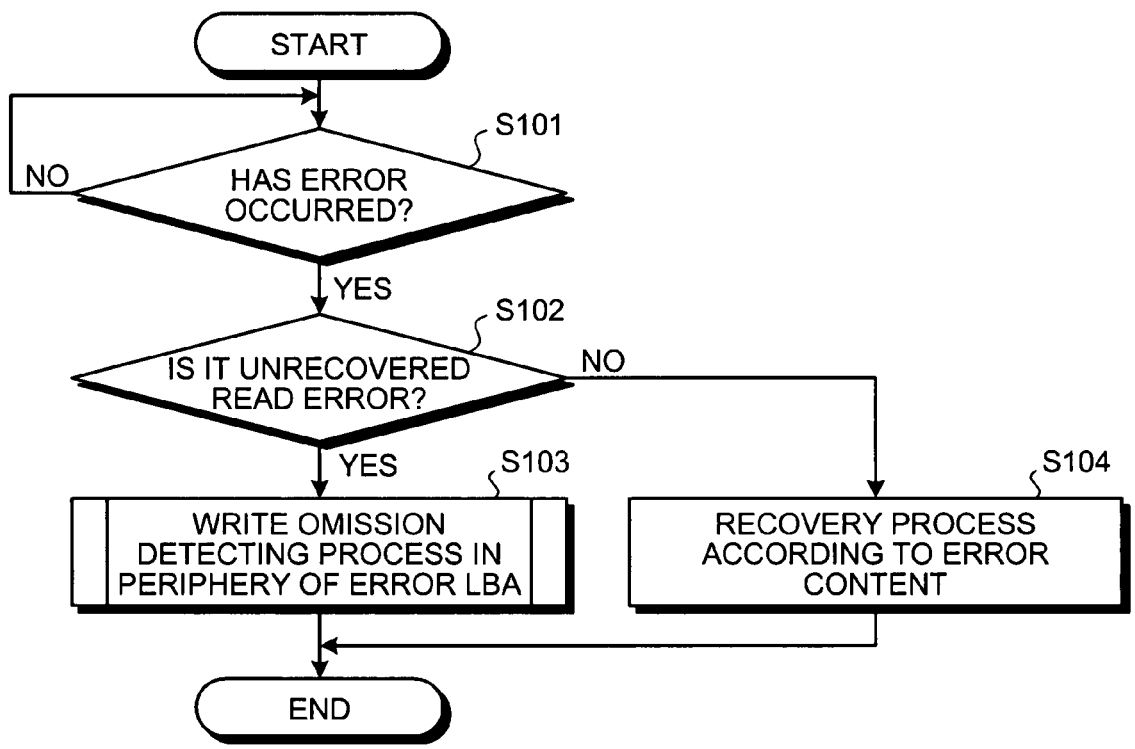
FIG. 8 is a flowchart of a process operation performed by the device adaptor according to the first embodiment.

The process performed by the device adaptor 10 according to the first embodiment is explained with reference to FIG. 8. FIG. 8 is a flowchart of a process operation performed by the device adaptor 10 according to the first embodiment.

As shown in FIG. 8, upon occurrence of an error during the disk reply at the time of reading data from the disks 30 (Yes at step S101), the error detecting unit 13a of the device adaptor 10 determines whether the error is the unrecovered read error (step S102). If the error is the unrecovered read error (Yes at step S102), the error detecting unit 13a notifies the write omission-detecting unit 13b to carry out the write omission detecting process in the periphery of the block that includes the unrecovered read error.

If the error is not the unrecovered read error (No at step S102), the error detecting unit 13a notifies the recovery unit 13c to carry out the write omission detecting process in the periphery of the block that includes the unrecovered read error, and instructs the write omission-detecting unit 13b to carry out the recovery process that is explained later (step S103). Upon receiving the notification from the error detecting unit 13a to execute the recovery process according to the error content for an error other than the unrecovered read error, the recovery unit 13c carries out the recovery process according to the error content (step S104).

Figure 9:
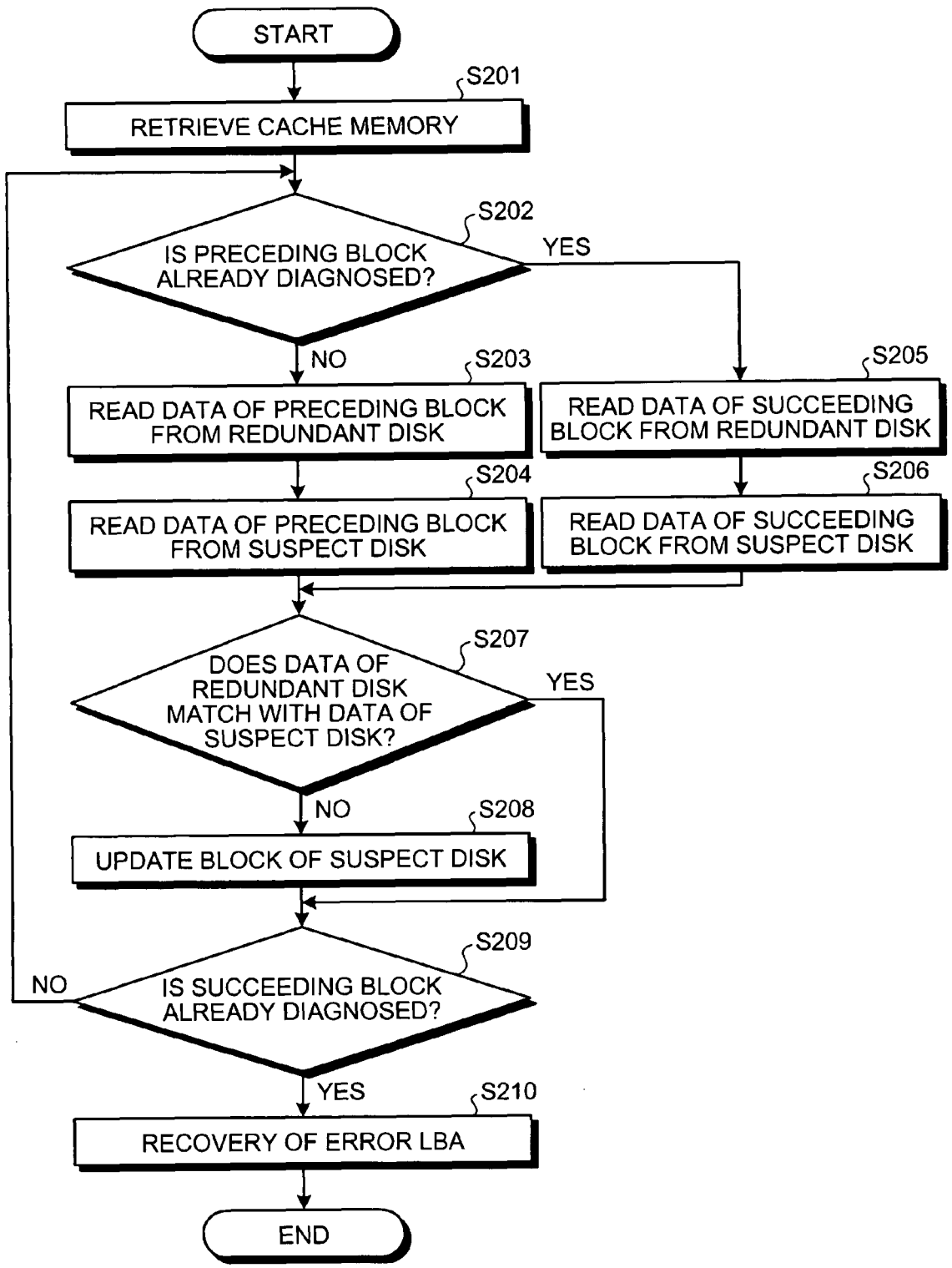
FIG. 9 is a flowchart of a write omission detecting process operation performed by the device adaptor according to the first embodiment.

The write omission detecting process performed by the device adaptor 10 according to the first embodiment is explained next with reference to FIG. 9. FIG. 9 is a flowchart of a write omission detecting process operation performed by the device adaptor 10 according to the first embodiment.

As shown in FIG. 9, upon receiving the notification from the error detecting unit 13a to carry out the write omission detecting process, the write omission-detecting unit 13b of the device adaptor 10 retrieves the cache memory 220 of the CM 20 (step S201). Next, the write omission-detecting unit 13b determines whether the preceding block is already diagnosed (step S202). If the preceding block is not already diagnosed (No at step S202), the write omission-detecting unit 13b reads from the cache memory 220, data of the block in the redundant disk 30a corresponding to the preceding block of the suspect disk 30b (step S203) and reads from the buffer 14a, data of the preceding block of the suspect disk 30b (step S204).

If the preceding block is already diagnosed (Yes at step S202), the write omission-detecting unit 13b reads from the cache memory 220, data of the block in the redundant disk 30a corresponding to the succeeding block of the suspect disk 30b (step S205) and reads from the buffer 14a, data of the succeeding block of the suspect disk 30b (step S206). Next, the write omission-detecting unit 13b determines whether the read data of the redundant disk 30a matches with the read data of the suspect disk 30b (step S207). If the read data of the redundant disk 30a does not match with the read data of the suspect disk 30b (No at step S207), the write omission-detecting unit 13b notifies the later explained recovery unit 13c that the block includes the write omission.

Upon receiving from the write omission-detecting unit 13b the notification that the block includes the write omission, the recovery unit 13c updates the block that includes the write omission in the suspect disk 30b to the corresponding block of the redundant disk 30a (step S208). Further, if the read data of the redundant disk 30a matches with the read data of the suspect disk 30b (Yes at step S207), the write omission-detecting unit 13b notifies the recovery unit 13c that the block does not include the write omission.

After updating the block that includes the write omission (step S208) or after receiving the notification that the block does not include the write omission (Yes at step S207), the recovery unit 13c determines whether the succeeding block is already diagnosed (step S209). If the succeeding block is not already diagnosed (No at step S209), the recovery unit 13c notifies and instructs the write omission-detecting unit 13b to diagnose the succeeding block and the write omission detecting process moves to step S202. If the succeeding block is already diagnosed (Yes at step S209), the recovery unit 13c carries out the recovery process of error LBA that indicates the block that includes the unrecovered read error (step S210).

The device adaptor 10 detects the block that includes the read error and detects the write omission in the blocks that are within the predetermined range from the detected block. Due to this, when carrying out the writing process, the write omission is detected without detecting the write omission in all the blocks. Thus, deterioration in the processing performance can be prevented while detecting the write omission.

According to the first embodiment, the predetermined range is received, the predetermined range is set, and the write omission is detected in the blocks that are within the set predetermined range. As a result, the predetermined range is set randomly without necessitating a processing load to dynamically change the predetermined range and the write omission can be detected more easily.

According to the first embodiment, if a block within the predetermined range is unreadable, the block is removed from the detection target. Thus, by detecting only the blocks within the predetermined range, the write omission scan be detected more easily.

According to the first embodiment, data of the detected block that includes the write omission is updated to data of the corresponding block in the redundant disk. Thus, the data of the block that includes the write omission can be normalized.

The embodiment of the present invention is explained. However, various modifications may be made other than the specific details and representative embodiments shown and described herein. Other embodiments included in the present invention are explained below as a second embodiment of the present invention.

(1) Write Omission Detection Range

A prior set detection range of the write omission is explained in the first embodiment. However, the present invention is not to be thus limited and the detection range of the write omission can also be changed dynamically.

To be specific, the device adaptor 10 determines the detection range of the write omission (in other words, a range that indicates a number of blocks for detecting the write omission from the block that includes the unrecovered read error) according to any one or more of a number of heads that carry out read/write, a rotating speed of the heads, a disk vendor, and a type of the disk. When carrying out the write omission detecting process, the device adaptor 10 detects the write omission within the determined detection range.

Thus, the predetermined range is determined according to any one or more of the number of heads that carry out read/write, the rotating speed of the heads, the disk vendor, and the type of the disk and the write omission is detected in the blocks that are within the predetermined range. Thus, dynamically changing the predetermined range without fixing the predetermined range enables to detect the write omission further appropriately.

(2) Diagnosis Skip

In the first embodiment, if a block within the diagnosis range cannot be read due to the read error, the block is removed from a write omission detection target. However, if a block within the diagnosis range cannot be read due to the read error, the write omission can also be detected in an adjoining block of the block. For example, if the device adaptor 10 detects a block which includes an unrecovered read error and cannot read a succeeding block of the block that includes the unrecovered read error, the device adaptor 10 treats a further succeeding block as the write omission detection target and detects the write omission.

Thus, if a block within the predetermined range cannot be read, the write omission is detected in the adjoining block of the block. Due to this, apart from the blocks within the predetermined range, the write omission is also detected in blocks that are outside the predetermined range but are highly likely to include the write omission, thus enabling to further precisely detect the write omission.

(3) System Structure etc.

The constituent elements of the device illustrated are merely conceptual and may not necessarily physically resemble the structures shown in the drawings. For instance, the device need not necessarily have the structure that is illustrated. The device as a whole or in parts can be broken down or integrated either functionally or physically in accordance with the load or how the device is to be used. For example, the error detecting unit 13a and the write omission-detecting unit 13b can be integrated. Further, the process functions performed by the apparatus are entirely or partially realized by a CPU or a program executed by the CPU or by a hardware using wired logic.

All the automatic processes explained in the present embodiment can be, entirely or in part, carried out manually. Similarly, all the manual processes explained in the present embodiment can be entirely or in part carried out automatically by a known method. The sequence of processes, the sequence of controls, specific names, and data including various parameters can be changed as required unless otherwise specified.

(4) Computer Programs

Figure 10:
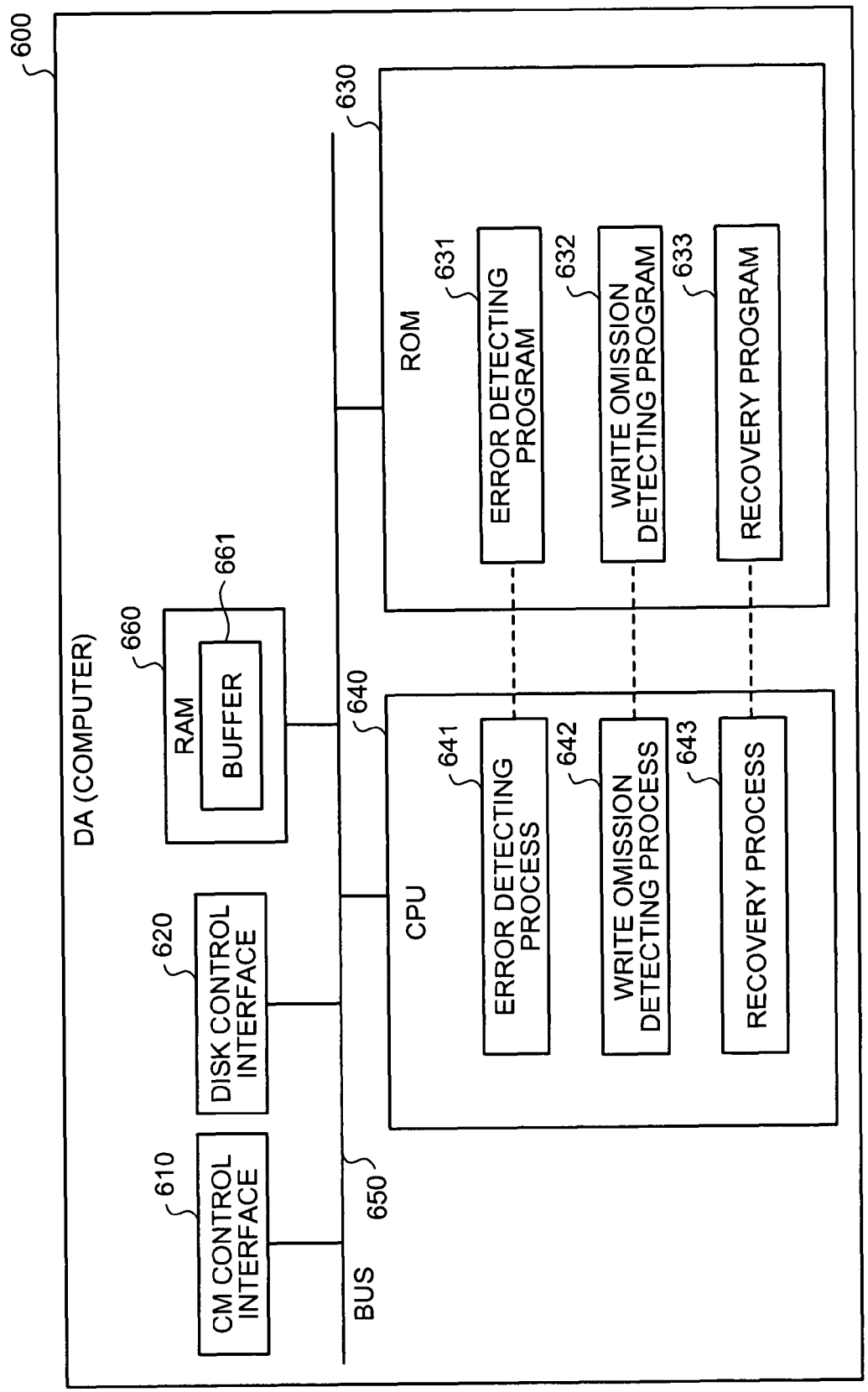
FIG. 10 is a block diagram of a computer that executes a write omission detecting program.
Figure 11:
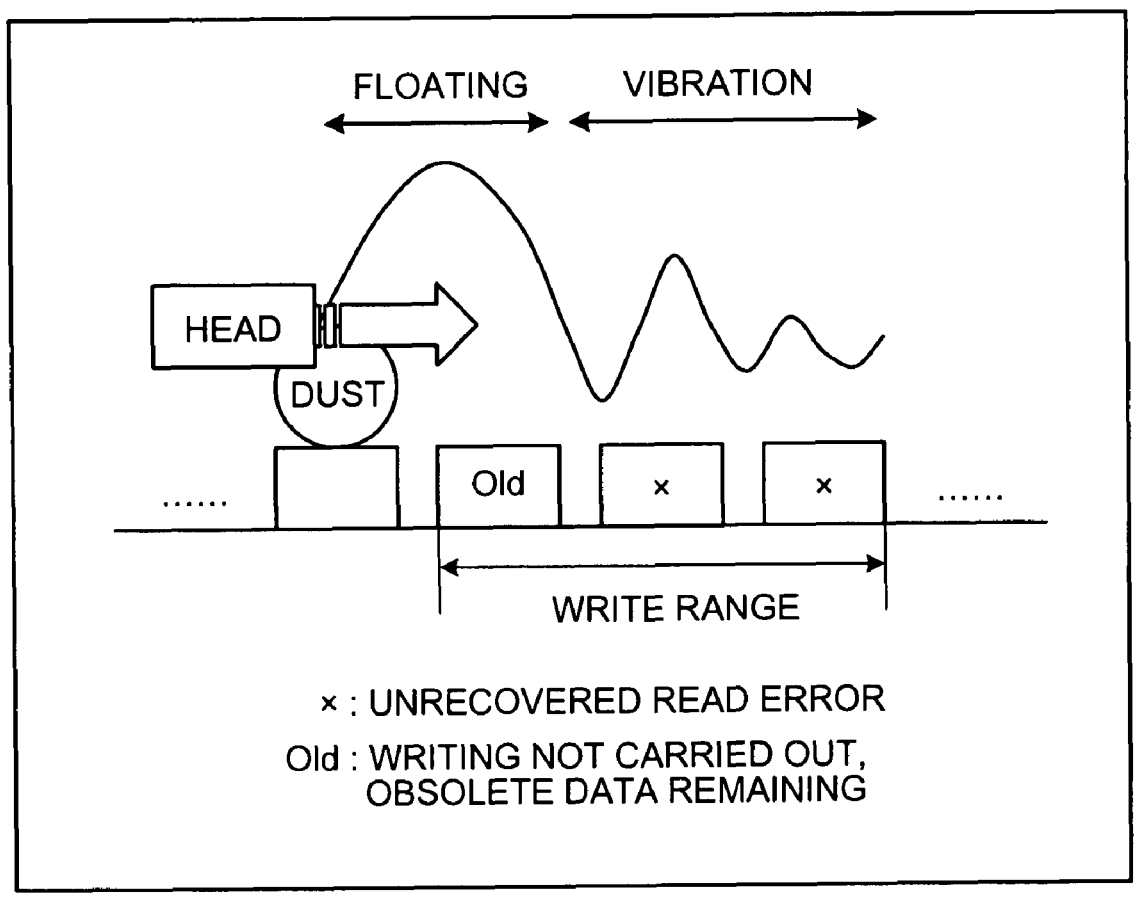
FIG. 11 is a schematic for explaining the write omission phenomenon.

Each process explained in the embodiment can be realized by executing a prior formulated computer program on a computer. An example of the computer, which executes the computer program that includes functions similar to the embodiment mentioned earlier, is explained next. FIG. 10 is a block diagram of the computer that executes a write omission detecting program.

As shown in FIG. 10, a computer 600 as the write omission detecting program includes a CM control interface 610, a disk control interface 620, a Read Only Memory (ROM) 630, a CPU 640, and a Random Access Memory (RAM) 660 that are connected by a bus 650.

As shown in FIG. 10, the ROM 630 prior stores therein a device adaptor that exhibits functions similar to the functions explained the embodiment mentioned earlier, in other words, an error detecting program 631, a write omission detecting program 632, and a recovery program 633. Similarly as each component of the device adaptor 10 shown in FIG. 3, the error detecting program 631, the write omission detecting program 632, and the recovery program 633 can be appropriately integrated or broken down.

The CPU 640 reads from the ROM 630 and executes the error detecting program 631, the write omission detecting program 632, and the recovery program 633, thus causing the error detecting program 631, the write omission detecting program 632, and the recovery program 633 to function as an error detecting process 641, a write omission detecting process 642, and a recovery process 643 respectively. The error detecting process 641, the write omission detecting process 642, and the recovery process 643 correspond to the error detecting unit 13a, the write omission-detecting unit 13b, and the recovery unit 13c respectively that are shown in FIG. 3.

The CPU 640 reads data from a not shown disk, stores the read data in a buffer 661 of the RAM 660, and executes various processes based on the data that is stored in the RAM 660.

According to an embodiment of the present invention, when carrying out a write process, because a write omission is detected without detecting the write omission in all the blocks, deterioration in the processing performance can be prevented while detecting the write omission.

According to an embodiment of the present invention, the write omission can be detected more easily and more precisely. Moreover, data of a block that includes the write omission can be normalized.

Although the invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth.

What is claimed is:

1. A write omission detector that detects write omission in a first storage medium that is divided into a plurality of blocks, the blocks storing therein data received from a server, the write omission detector comprising:
   a block detection unit that detects an error block where an unrecovered read error has occurred; and
   a write-omission detecting unit that detects a block where the write omission has occurred based on comparison of first data among the data in a block positioned within a predetermined range from the error block and second data in a second storage medium, the second data being redundantly stored for the first data.

2. The write omission detector according to claim 1, further comprising a setting unit that sets the predetermined range based on an input value.

3. The write omission detector according to claim 1, further comprising a determining unit that determines the predetermined range according to any one or more of a number of heads that carry out reading and writing, a rotating speed of the heads, a vendor of the first storage medium, and a type of the first storage medium.

4. The write omission detector according to claim 1, further comprising an unreadable-block determining unit that determines whether there is an unreadable block in the predetermined range, wherein
   the write-omission detecting unit excludes the unreadable block while performing the comparison.

5. The write omission detector according to claim 4, wherein the write-omission detecting unit performs the comparison for an adjoining block of the unreadable block.

6. The write omission detector according to claim 1, further comprising an updating unit that updates data of the block where the write omission has occurred to data of a corresponding block in the second storage medium.

7. The write omission detector according to claim 1, wherein the write-omission detecting unit detects a block where the write omission has occurred when the first data included in the block in the first storage medium is not equal to the second data in the second storage medium.

8. The write omission detector according to claim 1, wherein the write-omission detecting unit carries a write omission detecting process when the block detection unit detects the error block.

9. A method of detecting write omission in a first storage medium that is divided into a plurality of blocks, the blocks storing therein data received from a server, the method comprising:
   first detecting including detecting an error block where an unrecovered read error has occurred; and
   second detecting including detecting a block where the write omission has occurred based on comparison of first data among the data in a block positioned within a predetermined range from the error block and second data in a second storage medium, the second data being redundantly stored for the first data.

10. The method according to claim 9, further comprising setting the predetermined range based on an input value.

11. The method according to claim 9, further comprising determining the predetermined range according to any one or more of a number of heads that carry out reading and writing, a rotating speed of the heads, a vendor of the first storage medium, and a type of the first storage medium.

12. The method according to claim 9, further comprising determining whether there is an unreadable block in the predetermined range, wherein
   the second detecting includes excluding the unreadable block while performing the comparison.

13. The method according to claim 12, wherein the second detecting includes performing the comparison for an adjoining block of the unreadable block.

14. The method according to claim 9, further comprising updating data of the block where the write omission has occurred to data of a corresponding block in the second storage medium.

15. The method according to claim 9, wherein the second detecting includes detecting a block where the write omission has occurred when the first data included in the block in the first storage medium is not equal to the second data in the second storage medium.

16. A computer-readable recording medium that stores therein a computer program that causes a computer to detect write omission in a first storage medium that is divided into a plurality of blocks, the blocks storing therein data received from a server, the computer program causing the computer to execute:
   first detecting an error block where an unrecovered read error has occurred; and
   second detecting a block where the write omission has occurred based on comparison of first data among the data in a block positioned within a predetermined range from the error block and second data in a second storage medium, the second data being redundantly stored for the first data.

17. The computer-readable recording medium according to claim 16, wherein the second detecting includes detecting a block where the write omission has occurred when the first data included in the block in the first storage medium is not equal to the second data in the second storage medium.

* * * * *